(12) United States Patent
Dhakras et al.

(10) Patent No.: US 11,238,009 B1
(45) Date of Patent: Feb. 1, 2022

(54) TECHNIQUES FOR AUTOMATED POLICY ANALYSIS

(71) Applicant: Veritas Technologies LLC, Mountain View, CA (US)

(72) Inventors: Nilesh Ramesh Dhakras, Maharashtra (IN); Akashkumar Vinodray Bhimani, Pune (IN); Saurabh Kailash Agrawal, Pradesh (IN); Mayuri Dhananjay Kotwal, Maharashtra (IN)

(73) Assignee: VERITAS TECHNOLOGIES LLC, Mountain View, CA (US)

( * ) Notice: Subject to any disclaimer, the term of this patent is extended or adjusted under 35 U.S.C. 154(b) by 446 days.

(21) Appl. No.: 13/800,356

(22) Filed: Mar. 13, 2013

(51) Int. Cl.
*G06F 16/11* (2019.01)
*G06F 16/21* (2019.01)
*G06F 11/14* (2006.01)
*G06F 3/06* (2006.01)

(52) U.S. Cl.
CPC .......... *G06F 16/122* (2019.01); *G06F 3/0649* (2013.01); *G06F 11/1446* (2013.01); *G06F 16/21* (2019.01)

(58) Field of Classification Search
CPC ............. G06F 11/1458; G06F 11/1461; G06F 11/1448; G06F 11/1446; G06F 16/122
See application file for complete search history.

(56) References Cited

U.S. PATENT DOCUMENTS

| | | | |
|---|---|---|---|
| 7,330,997 B1 * | 2/2008 | Odom ................. | G06F 11/1464 711/162 |
| 7,778,959 B2 * | 8/2010 | Fries ................... | G06F 11/1464 707/609 |
| 8,027,951 B2 * | 9/2011 | Doatmas et al. ............. | 707/610 |
| 9,632,875 B2 * | 4/2017 | Raichstein .......... | G06F 11/1461 |
| 2003/0185064 A1 * | 10/2003 | Hirakawa et al. ............ | 365/200 |
| 2006/0129615 A1 * | 6/2006 | Derk et al. ..................... | 707/204 |
| 2006/0236061 A1 * | 10/2006 | Koclanes .............. | G06F 3/0605 711/170 |
| 2007/0198722 A1 * | 8/2007 | Kottomtharayil ....... | H04L 12/66 709/226 |
| 2009/0144341 A1 * | 6/2009 | Hauck et al. ................. | 707/202 |
| 2009/0187908 A1 * | 7/2009 | He ......................... | G06F 9/4881 718/102 |
| 2009/0292888 A1 * | 11/2009 | Srivastava .......... | G06F 11/1464 711/162 |
| 2011/0082837 A1 * | 4/2011 | Cherkasova ........ | G06F 11/1461 707/654 |
| 2011/0246735 A1 * | 10/2011 | Bryant ................ | G06F 11/1448 711/162 |

(Continued)

*Primary Examiner* — Ashish Thomas
*Assistant Examiner* — Jedidiah P Ferrer
(74) *Attorney, Agent, or Firm* — Patent Law Works LLP

(57) ABSTRACT

Techniques for automated policy analysis are disclosed. In one particular embodiment, the techniques may be realized as a method for automated policy analysis comprising processing system configuration information for a system, processing policy configuration information for the system, analyzing at least one policy configuration change to the policy configuration information, recommending the at least one policy configuration change based on the analysis of the at least one policy configuration change, and updating the policy configuration information for the system based on the recommendation of the at least one policy configuration change.

15 Claims, 7 Drawing Sheets

(56) References Cited

U.S. PATENT DOCUMENTS

| | | | |
|---|---|---|---|
| 2011/0276539 A1* | 11/2011 | Thiam | 707/634 |
| 2011/0295811 A1* | 12/2011 | Cherkasova | G06F 17/30073 707/654 |
| 2012/0005449 A1* | 1/2012 | Reed | G06F 3/0631 711/E12.001 |
| 2012/0079326 A1* | 3/2012 | Riegel | G06F 11/008 714/38.1 |
| 2012/0084501 A1* | 4/2012 | Watanabe et al. | 711/112 |
| 2012/0131583 A1* | 5/2012 | Cherkasova | G06F 11/1461 718/102 |
| 2012/0331248 A1* | 12/2012 | Kono et al. | 711/162 |
| 2013/0018946 A1* | 1/2013 | Brown | G06F 11/1448 709/203 |
| 2013/0085995 A1* | 4/2013 | Mostachetti et al. | 707/640 |
| 2013/0198449 A1* | 8/2013 | Belluomini | G06F 17/3007 711/114 |
| 2013/0311923 A1* | 11/2013 | Spivak | G11B 27/36 715/771 |
| 2013/0326032 A1* | 12/2013 | Duarte | G06F 9/5011 709/221 |
| 2014/0089495 A1* | 3/2014 | Akolkar | G06F 9/5005 709/224 |

\* cited by examiner

TECHNIQUES FOR AUTOMATED POLICY ANALYSIS

FIELD OF THE DISCLOSURE

The present disclosure relates generally to policy analysis and, more particularly, to techniques for automated policy analysis.

BACKGROUND OF THE DISCLOSURE

Computer and network administrators may assign policies to their systems that govern whether and when certain tasks or jobs should be performed. For example, a backup administrator may schedule backup jobs during certain periods of time called a "backup window." The backup window may be selected during off-peak times so that the resources consumed during a backup job do not constrain productivity during peak usage times. Additionally, a backup administrator may need to coordinate the backup schedule so that resources consumed during one backup job do not constrain resources needed for another backup job.

For example, a backup administrator may wish to avoid a situation in which two source systems are trying to run a backup job to the same target system while a second target system is idle. In this situation, backup jobs may not finish within the allotted time. These jobs may have finished on time if they had been distributed optimally across all available target systems. A backup administrator also may wish to avoid a situation in which a large source system targets a low capacity target system, while a small source system targets a high capacity target system. The large backup job may not complete if the low capacity target system runs out of space, whereas both backup jobs may have completed if the needed capacity had been distributed optimally across all available target systems.

A backup administrator may also wish to devise a solution that is robust enough to withstand uncontrollable variables. For example, a target system may be unexpectedly unavailable due to hardware or network outages, or a source system may have an unexpected increase in data that causes a target system to run out of capacity unexpectedly. Even if a backup job can be rerouted to a different target system, the backup jobs may take too long and fail to complete within the designated backup window.

These resource management problems become rapidly more complex for larger numbers of backup jobs that must be scheduled. Furthermore, the number of backup jobs and the size of each backup job is constantly in flux. Source and target systems may be added or removed from the network. The amount of data on a given source system may grow or shrink while it is in use, and target systems may gradually run out of capacity if they store multiple backup revisions.

Conventional policy analysis tools provide retrospective policy analysis. They may analyze a history of jobs, including jobs that failed, jobs that remained in a queue for a long time, and jobs that ran too long. Backup administrators may make adjustments to the policies based on prior job history, but jobs may fail anyway due to changing network conditions or suboptimal adjustments.

In view of the foregoing, it may be understood that there may be significant problems and shortcomings associated with conventional technologies for policy analysis.

SUMMARY OF THE DISCLOSURE

Techniques for automatic policy analysis are disclosed. In one particular embodiment, the techniques may be realized as a method for automated policy analysis comprising processing system configuration information for a system, processing policy configuration information for the system, analyzing at least one policy configuration change to the policy configuration information, recommending the at least one policy configuration change based on the analysis of the at least one policy configuration change, and updating the policy configuration information for the system based on the recommendation of the at least one policy configuration change.

In accordance with further aspects of this particular embodiment, wherein the system may be a backup system comprising at least one backup source and at least one backup target, and wherein the policy configuration change includes changing a scheduled time of at least one backup job.

In accordance with further aspects of this particular embodiment, wherein the backup system may further comprise at least one backup target pool comprising multiple backup targets.

In accordance with further aspects of this particular embodiment, wherein recommending the at least one policy configuration change may further comprise resolving at least one backup job conflict based on the at least one policy configuration change.

In accordance with further aspects of this particular embodiment, wherein the at least one backup job conflict may comprise a first backup time period of a first backup job overlapping a second backup time period of a second backup job.

In accordance with further aspects of this particular embodiment, wherein the at least one backup job conflict may comprise a first end time of a backup job that is later than a second end time of a backup window of the policy configuration information.

In accordance with further aspects of this particular embodiment, wherein the method may further comprise analyzing at least one system configuration change to the system configuration information, recommending the at least one system configuration change based on the analysis of the at least one system configuration change, and updating the policy configuration information for the system based on the recommendation of the at least one system configuration change.

In accordance with further aspects of this particular embodiment, wherein the system may be a backup system, and the at least one system configuration change includes adding a new backup target to the backup system.

In another particular exemplary embodiment, the techniques may be realized as a system for automated policy analysis comprising one or more processors communicatively coupled to a network, wherein the one or more processors may be configured to process system configuration information for a system, process policy configuration information for the system, analyze at least one policy configuration change to the policy configuration information, recommend the at least one policy configuration change based on the analysis of the at least one policy configuration change, and update the policy configuration information for the system based on the recommendation of the at least one policy configuration change.

In accordance with additional aspects of this particular embodiment, wherein the system may be a backup system comprising at least one backup source and at least one backup target, and wherein the policy configuration change may include changing a scheduled time of at least one backup job.

In accordance with additional aspects of this particular embodiment, wherein the backup system may further comprise at least one backup target pool comprising multiple backup targets.

In accordance with additional aspects of this particular embodiment, wherein recommending the at least one policy configuration change may comprise resolving at least one backup job conflict based on the at least one policy configuration change.

In accordance with additional aspects of this particular embodiment, wherein the at least one backup job conflict may comprise a first backup time period of a first backup job overlapping a second backup time period of a second backup job.

In accordance with additional aspects of this particular embodiment, wherein the one or more processors may be further configured to analyze at least one system configuration change to the system configuration information, recommend the at least one system configuration change based on the analysis of the at least one system configuration change, and update the policy configuration information for the system based on the recommendation of the at least one system configuration change.

In yet another particular exemplary embodiment, the techniques may be realized as an article of manufacture for automated policy analysis, the article of manufacture comprising at least one non-transitory processor readable storage medium, and instructions stored on the at least one medium, wherein the instructions may be configured to be readable from the at least one medium by at least one processor and thereby cause the at least one processor to operate so as to process system configuration information for a system, process policy configuration information for the system, analyze at least one policy configuration change to the policy configuration information, recommend the at least one policy configuration change based on the analysis of the at least one policy configuration change, and update the policy configuration information for the system based on the recommendation of the at least one policy configuration change.

In accordance with additional aspects of this particular embodiment, wherein the system may be a backup system comprising at least one backup source and at least one backup target, and wherein the policy configuration change may include changing a scheduled time of at least one backup job.

In accordance with additional aspects of this particular embodiment, wherein the backup system may further comprise at least one backup target pool comprising multiple backup targets.

In accordance with additional aspects of this particular embodiment, wherein recommending the at least one policy configuration change may comprise resolving at least one backup job conflict based on the at least one policy configuration change.

In accordance with additional aspects of this particular embodiment, wherein the at least one backup job conflict comprises a first backup time period of a first backup job overlapping a second backup time period of a second backup job.

In accordance with additional aspects of this particular embodiment, wherein the instructions may cause the at least one processor to operate further so as to analyze at least one system configuration change to the system configuration information recommend the at least one system configuration change based on the analysis of the at least one system configuration change, update the policy configuration information for the system based on the recommendation of at least one system configuration change.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
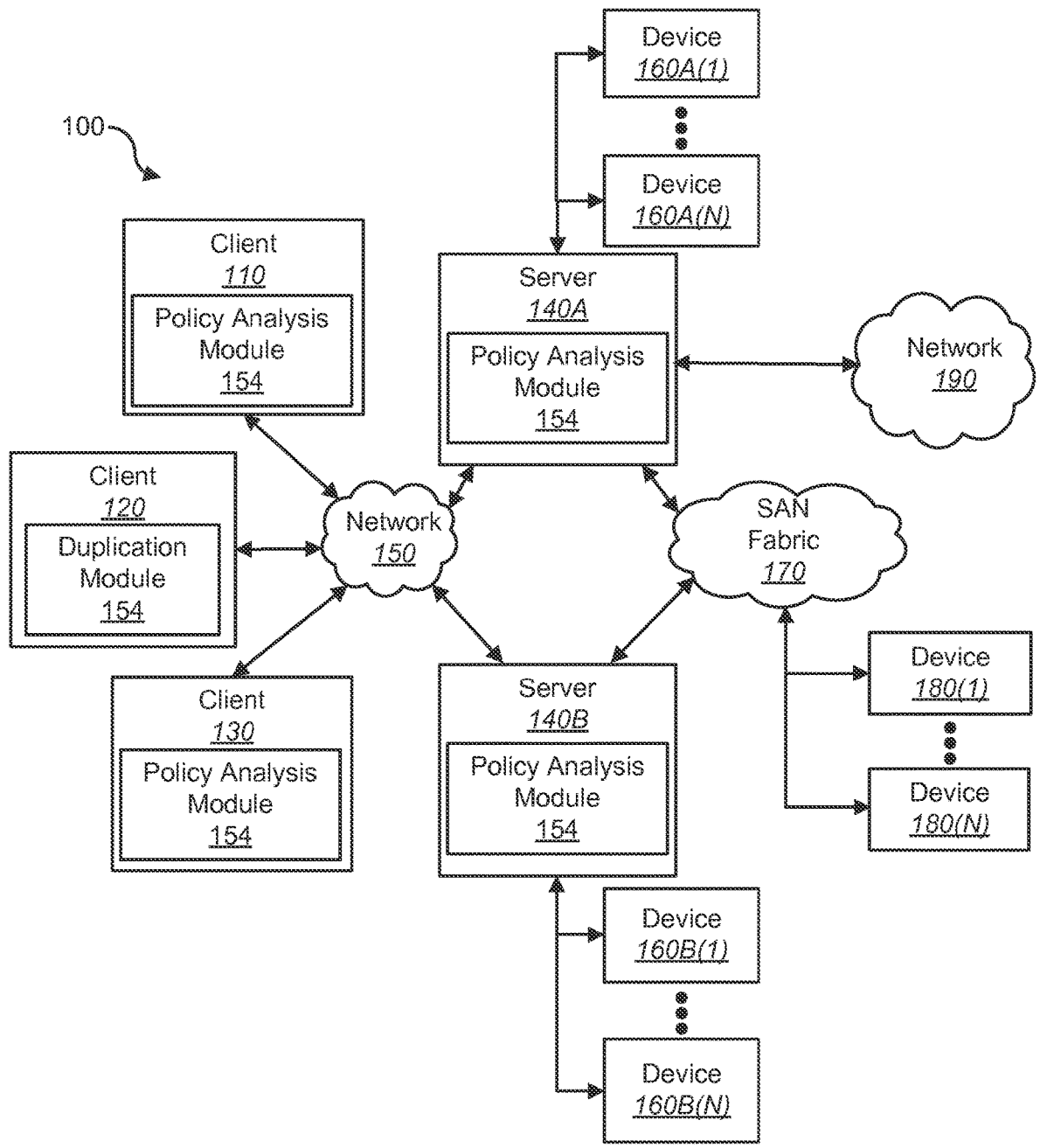
FIG. 1 shows a block diagram depicting a network architecture for policy analysis in accordance with an embodiment of the present disclosure.

FIG. 1 shows a block diagram depicting a network architecture 100 for policy analysis in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., policy analysis module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
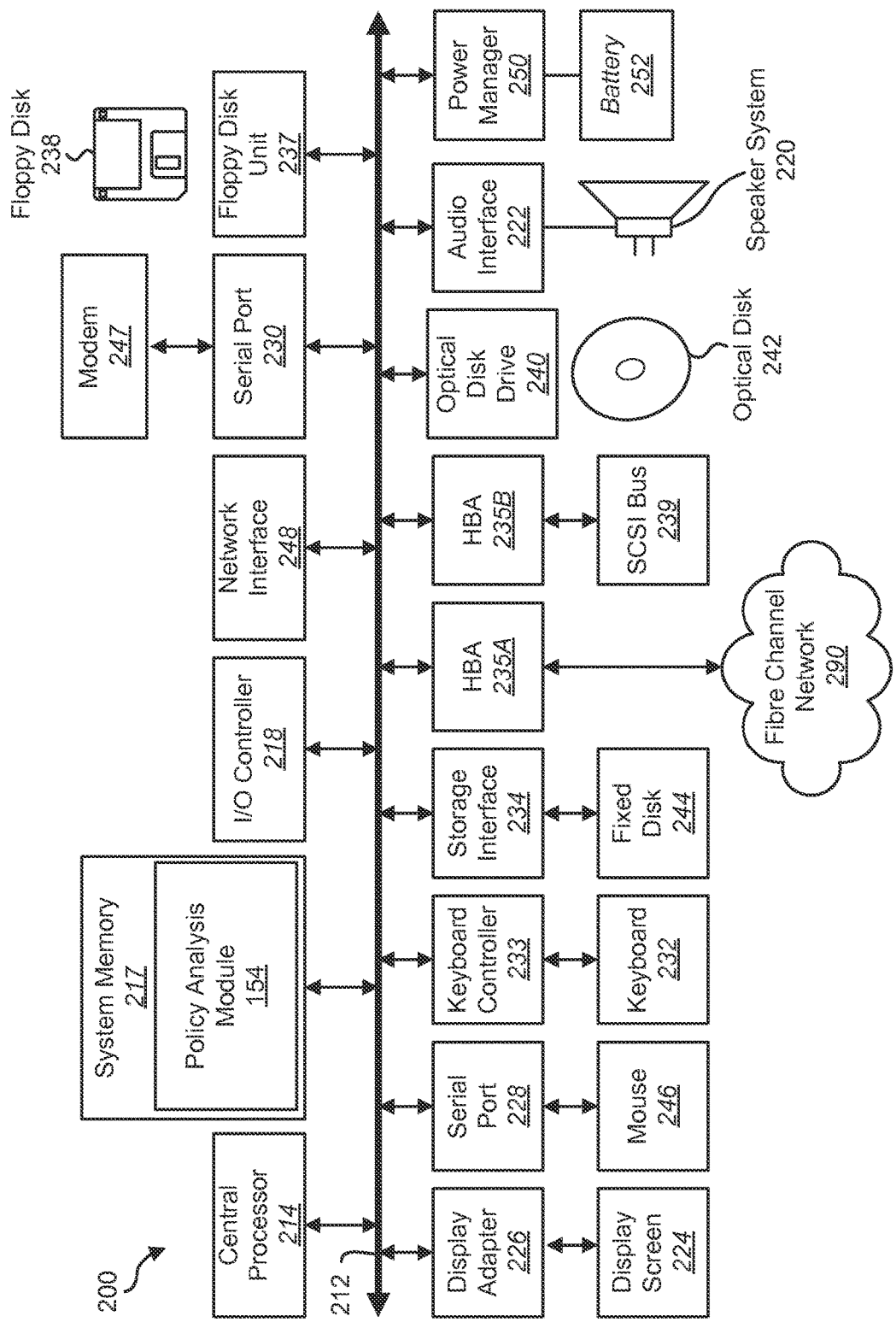
FIG. 2 depicts a block diagram of a computer system for policy analysis in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for policy analysis such as, for example, policy analysis module 154. As illustrated, one or more portions of policy analysis module 154 may reside at a network centric location. For example, server 140A may be a server, a firewall, a gateway, or other network element that may perform one or more actions to scan web applications for vulnerabilities. According to some embodiments, network 190 may be an external network (e.g., the Internet) and server 140A may be a gateway or firewall between one or more internal components and clients and the external network. According to some embodiments, policy analysis module 154 may be implemented as part of a cloud computing environment.

FIG. 2 depicts a block diagram of a computer system 200 for policy analysis in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, policy analysis module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
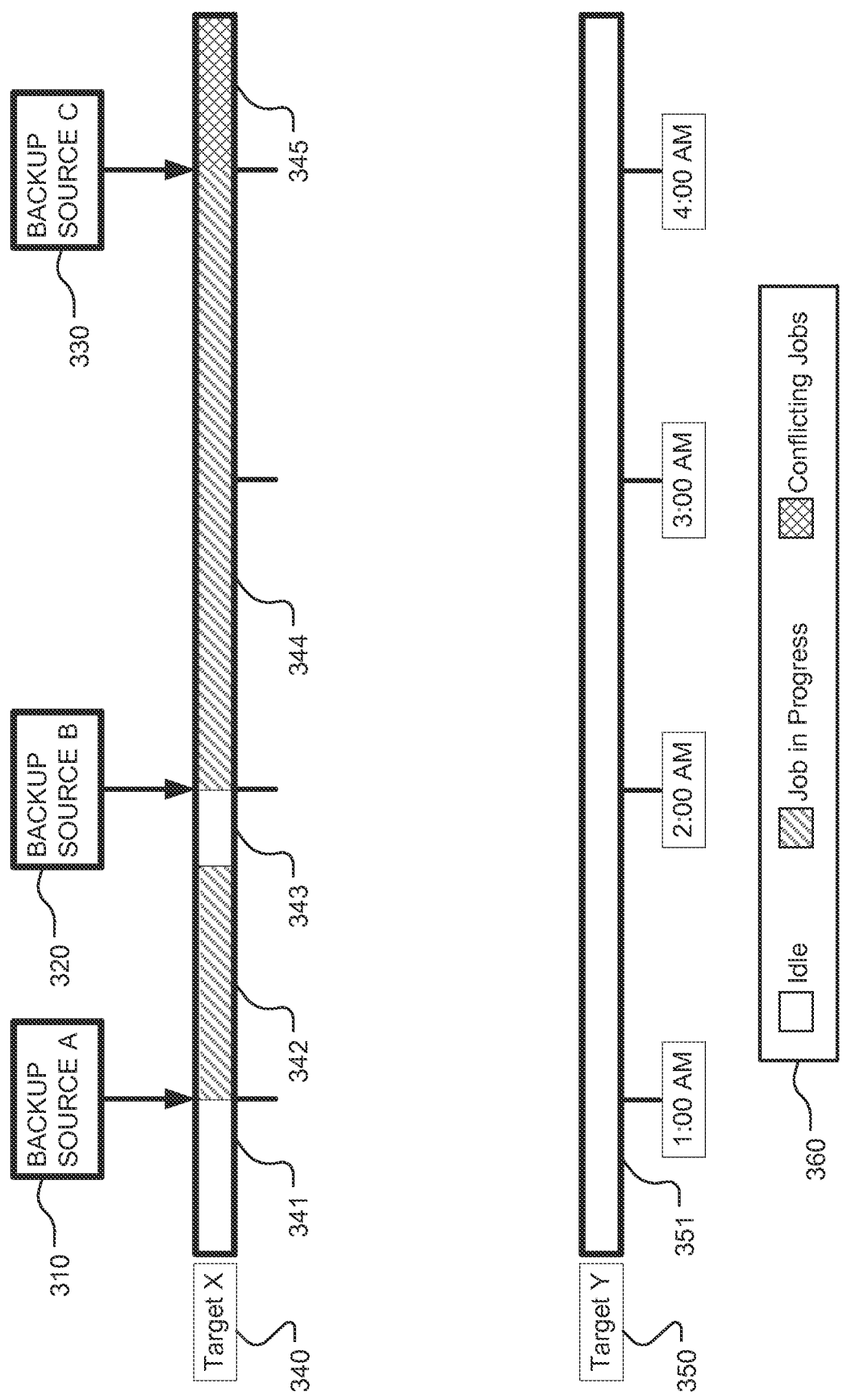
FIG. 3 depicts a block diagram of a policy configuration for policy analysis in accordance with an embodiment of the present disclosure.
Figure 4:
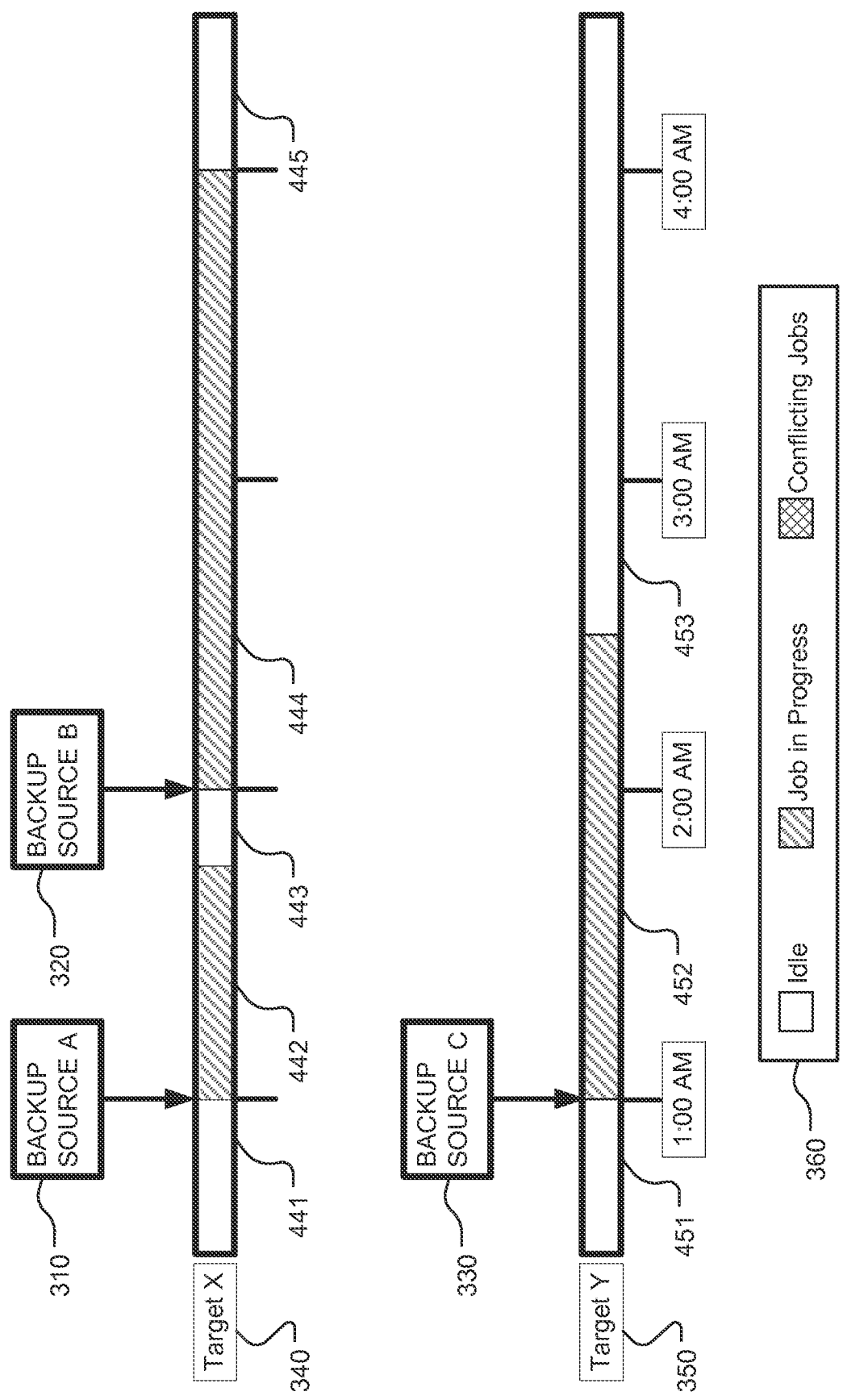
FIG. 4 shows a block diagram of another policy configuration for policy analysis in accordance with an embodiment of the present disclosure.
Figure 5:
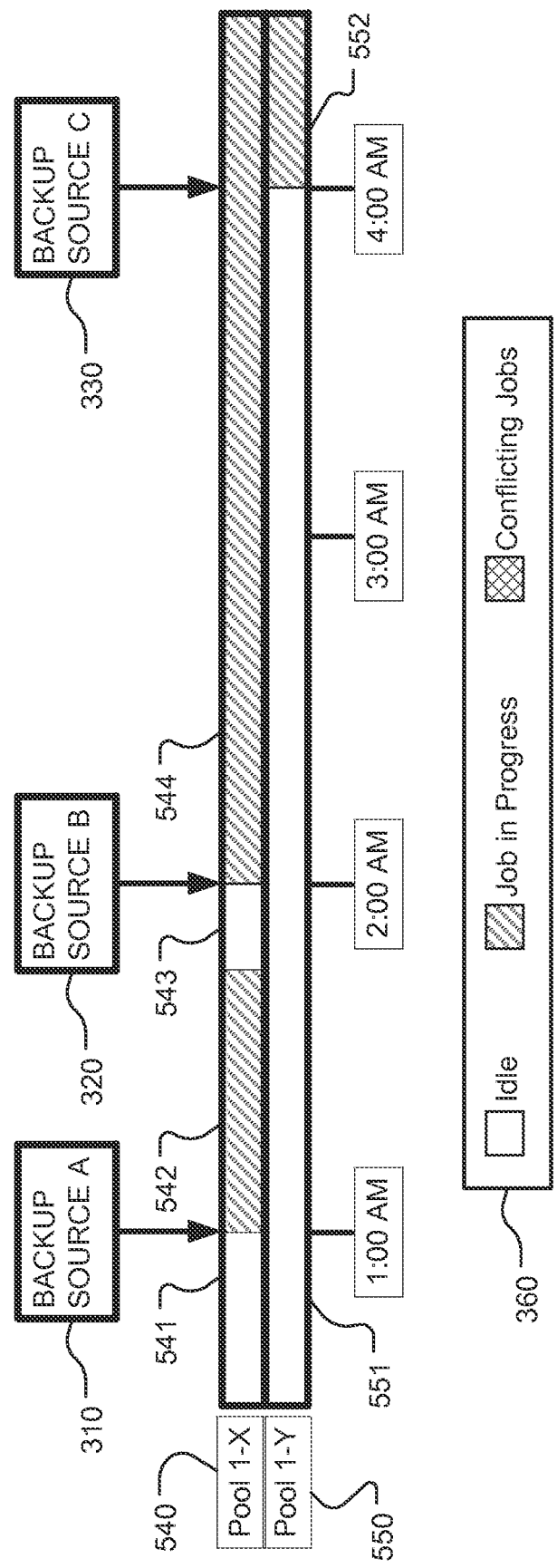
FIG. 5 depicts a block diagram of yet another policy configuration for policy analysis in accordance with an embodiment of the present disclosure.

Referring to FIGS. 3-5, there is shown examples of policy configurations and system configurations for policy analysis in accordance with embodiments of the present disclosure. The examples of policy configurations are shown in the context of backup policy configurations, but other contexts for policy configuration may be suitable for policy analysis in accordance with other embodiments of the present disclosure.

FIG. 3 depicts an example of a policy configuration for scheduling backup jobs within a backup window. In some embodiments, the time period designated as the backup window may be defined by the policy configuration. Three backup jobs for three backup sources 310, 320, and 330 and two backup targets 340 and 350 are shown along the time axis. At the beginning of the backup window, Target X 340 will be idle as shown in backup window time period 341, and Target Y 350 will be idle as shown in backup window time period 351.

Each backup target such as Target X 340 and Target Y 350 may be any type of backup storage, including a disk device, tape device, tape library, Virtual Tape Library (VTL) device, deduplication device, or cloud storage. The preceding types of backup storage are merely examples of various embodiments and is not intended to be an exhaustive list. A backup target such as Target X 340 and Target Y 350 is the device where backup data is stored. In some embodiments, a backup target may only accommodate a maximum number of concurrent operations according to backup target's design or specification. For example, if a backup target is a conventional tape drive, the tape drive may be limited to only writing one stream on the tape at a time. Other types of backup targets may not be limited to only writing one stream at a time. For example, a disk device may be capable of writing multiple streams of backup data concurrently.

The policy configuration shows a backup job for Backup Source A 310 to Target X 340 scheduled to begin within the backup window at 1:00 AM. Policy analysis estimates that the backup job for Backup Source A 310 will last for the duration shown in backup window time period 342. Policy analysis estimates that the backup job for Backup Source A 310 will complete before 2:00 AM, so Target X 340 will be idle again as shown in backup window time period 343.

In some embodiments, automatic policy analysis estimation is based on a previous history of one or more backup jobs to determine various information. For example, the information determined by automatic policy analysis may include the average size of the portion of data on a backup source that has changed and may be backed up. The information may also include the average write speed of the disk device, the average time it took to complete a backup job in a certain number of recent backup jobs, the average speed of the network over which backup data is transferred, or the current speed of the network over which backup data is transferred. Other types of information may be computed in other various embodiments.

Similarly, a backup job for Backup Source B 320 to Target X 340 is scheduled to begin at 2:00 AM, and a backup job for Backup Source C 330 to Target X 340 is scheduled to begin at 4:00 AM. Policy analysis estimates that the backup job for Backup Source B 320 will last more than two hours; therefore, it will not complete before the backup job for Backup Source C 330 is scheduled to begin. The backup job for Backup Source B 320 proceeds normally for the duration shown in backup window time period 344. At 4:00 AM, the backup job for Backup Source B 320 will conflict with the backup job for Backup Source C 330. The duration of this conflict is shown in backup window time period 345. In some embodiments, this conflict will delay the backup job for Backup Source C 330 from starting at the scheduled time of 4:00 AM. The backup job for Backup Source C 330 may be delayed until the backup job for Backup Source B 320 completes. If the backup job for Backup Source C 330 is delayed for too long, then the backup job for Backup Source C 330 may not complete before the end of the scheduled backup window.

Conflicting backup jobs may increase the risk of data loss or degrade system performance. For example, in some embodiments, the system configuration may terminate unfinished backup jobs at the end of the backup window. In other embodiments, the system configuration may allow backup jobs to complete, but backup jobs running outside the backup window may degrade system performance for other users. Policy analysis identifies time periods when the system may be underutilized (or under-provisioned), such as backup window time periods 341 and 343 when Target X 340 will be idle, or backup window time period 351 when Target Y 350 will be idle. Policy analysis also identifies time periods when the system be over-utilized (or overprovisioned), such as backup window time period 345 when conflicting jobs are scheduled for Target X 340.

Referring to FIG. 4, the system configuration may be the same as the system configuration depicted in FIG. 3, including three backup sources 310, 320, and 330, and two backup targets 340 and 350. In some embodiments, FIG. 4 may represent a recommendation for adjustments to the policy configuration shown in FIG. 3. In FIG. 4, as in FIG. 3, the backup job for Backup Source A 310 to Target X 340 is scheduled to begin at 1:00 AM, and the backup job for Backup Source B 320 to Target X 340 is scheduled to begin at 2:00 AM.

In FIG. 4, unlike FIG. 3, the backup job for Backup Source C 330 targets Target Y 350 instead of Target X 340, and it is scheduled to begin at 1:00 AM instead of 4:00 AM. As a result, Target X 340 is idle for the duration shown in backup window time period 441, in use for the backup job for Backup Source A 310 during time period 442, idle again during time period 443, in use for the backup job for Backup Source B 320 during time period 444, and idle again during time period 445. In FIG. 4, unlike FIG. 3, Target X 340 no longer estimates any conflicting backup jobs.

Furthermore, Target Y 350 will no longer be idle during the entire backup window. Instead, Target Y 350 will be idle for the time period 451, in use for the backup job for Backup Source C 330, and idle again during time period 453.

The recommended policy configuration shown in FIG. 4 may be preferred to the policy configuration shown in FIG. 3 because it does not have any conflicts. In some embodiments, there may be more than one possible policy configuration that the policy analysis system may recommend. For the system configuration shown in FIGS. 3 and 4, many arrangements of backup jobs may have provided a policy configuration that would be free of conflicts. For example, if the backup job for Backup Source B 320 had been retargeted to Target Y 350 instead of retargeting the backup job for Backup Source C 330 (not shown), this alternative policy configuration would also be free of conflicts.

Referring to FIG. 5, the system configuration may be similar to the system configuration depicted in FIGS. 3 and 4, including three backup sources 310, 320, and 330. The system configuration of FIG. 5 also has two backup targets 540 and 550; however, unlike the disparate backup targets Target X 340 and Target Y 350, the backup targets Pool 1-X 540 and Pool 1-Y 550 are part of the same backup target pool (i.e., "Pool 1").

In some embodiments, backup jobs may be configured to target a backup target pool rather than an individual backup target. A pool may be a group or set of one or more backup devices. If a backup job targets a pool, any available device within the pool may handle the backup job.

In FIG. 5, at the beginning of the backup window, Pool 1-X 540 will be idle as shown at time period 541, and Pool 1-Y 550 will be idle as shown at time period 551. The backup job for Backup Source A 310 to "Pool 1" is scheduled to begin at 1:00 AM. At 1:00 AM, either Pool 1-X 540 or Pool 1-Y 550 could be designated to receive the backup from Backup Source A 310. In FIG. 5, it is shown that Pool 1-X 540 will receive the backup from Backup Source A 310 during the time period 542 and will return to idle for the time period 543.

Similarly, the backup job for Backup Source B 320 is scheduled to begin at 2:00 AM, and either Pool 1-X 540 or Pool 1-Y 550 could be designated to receive the backup from Backup Source B 320. In FIG. 5, it is shown that Pool 1-X 540 will receive the backup from Backup Source B 320 during the time period 543.

The backup job for Backup Source C 330 is scheduled to begin at 4:00 AM. At 4:00 AM, Pool 1-X 540 will still be in use by the backup job for Backup Source B 320, as shown by time period 544. Consequently, the backup job for Backup Source C may be handled by Pool 1-Y 550 to avoid a conflict with the backup job for Backup Source B 320. At 4:00 AM, the backup job for Backup Source C 330 may proceed on Pool 1-Y 550 during time period 552 at the same time the backup job for Backup Source B 320 may continue on Pool 1-X 540 during time period 544.

In some embodiments, the system configuration may represent a pool of two backup targets as a single backup target that is capable of handling up to two or more backup jobs concurrently. A single backup target pool may have multiple backup targets capable of handling multiple concurrent backup jobs. In some embodiments, the policy analyzer may account for backup targets capable of handling more than one backup job at the same time and make a recommendation that accounts for any concurrency available in that particular system configuration. In some embodiments, a backup policy may have more than one backup target pool.

Figure 6:
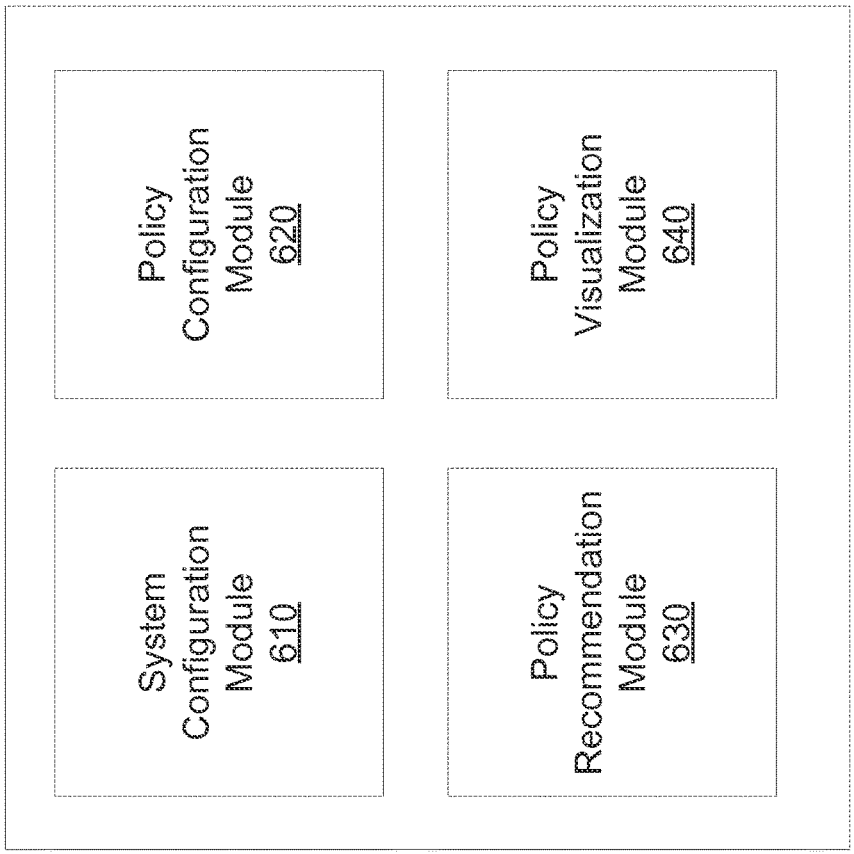
FIG. 6 shows a block diagram of a policy analysis module in accordance with an embodiment of the present disclosure.

Referring to FIG. 6, there is shown modules of a policy analysis module 154 in accordance with an embodiment of the present disclosure. A policy analysis module 154 may contain one or more components including a system configuration module 610, a policy configuration module 620, a policy recommendation module 630, and a policy visualization module 640.

The description below describes network elements, computers, and/or components of a system and method for policy analysis that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

In FIG. 6, according to some embodiments, system configuration module 610 may manage system configuration information. In the context of a backup policy, the system configuration information may comprise one or more backup sources and one or more backup targets. A backup source contains data that may be backed up to one or more backup targets. A backup target has capacity to receive data from one or more backup sources. In some embodiments, multiple backup targets may be configured as part of one or more backup target pools. A backup target pool may receive data from multiple backup sources simultaneously. For example, in some embodiments, a backup target pool consisting of two backup targets may receive data from up to two backup sources at the same time.

System configuration information may further include properties related to a particular backup source or backup target. For example, an individual backup source may have a known or estimated size (i.e., the quantity of data that may be backed up to one or more backup targets). Similarly, an individual backup target may have a known or estimated capacity (i.e., the quantity of data that may be received from one or more backup targets). Another system property may be the known or estimated bandwidth of a backup source or a backup target, which may be useful because the time required to back up a backup source will be a function of both its size and the available bandwidth (or throughput) at the backup source and at the backup target. Yet another system property may be the known or estimated robustness of a backup source or backup target. For example, a backup target on a wireless network may have a less reliable network connection than a backup target on a wired local area network. Connection reliability may be useful because it contributes to the probability that a particular backup job may succeed. System configuration information is not limited and may contain any number of potentially useful pieces of known or estimated information regarding the system configuration.

The system configuration module 610 processes system configuration information for a given system. In some embodiments, the system configuration information of the given system may be fixed. In other embodiments, the system configuration information may be changed by the system configuration module 610. The system configuration module 610 may update a property for one of the components of the system, such as the measured capacity of a particular backup target. In some embodiments, the system configuration module 610 may add or remove components in the system. For example, the system configuration module 610 may add an additional backup target to the system, or the system configuration module 610 may move an existing backup target from one backup target pool to another backup target pool.

The system configuration module 610 may provide processed system configuration information to the policy configuration module 620. In some embodiments, the system configuration information is associated with a policy configuration, such as a backup policy. A backup policy may include a scheduled time of a backup job, information about the backup source for the backup job, information about the backup target or backup target pool for the backup job, or options or other configuration information associated with the backup job.

A backup policy may also include certain rules. For example, the backup policy may include a backup window during which backup jobs may be scheduled. The backup window may be selected for a time period when resources consumed by backup jobs are less likely to be needed for other uses of the system. Another rule may specify the frequency of backups. For example, a backup policy may require all backup sources to be backed up every weeknight. Another rule may specify the quantity of backups. For example, a backup policy may require a backup source to be backed up to two different backup targets if the system configuration information designates the backup source as being high priority.

The policy configuration module 620 processes policy configuration information, such as a backup policy. In some embodiments, the policy configuration information of the given system may be fixed. In other embodiments the policy configuration information may be changed by the policy configuration module 620. For example, the policy configuration module 620 may lengthen the backup window to compensate for an over-utilized system configuration. Alternatively, the policy configuration module 620 may shorten the backup window to reduce idle time in an under-utilized system.

The policy recommendation module 630 may generate a recommendation for a policy configuration, such as a backup policy. In the context of a backup policy, the policy recommendation module 630 may analyze the system configuration information received from system configuration module 610 and the policy configuration information received from policy configuration module 620. The policy recommendation module 630 may take one or properties of the system configuration information and policy configuration information to generate a recommendation.

In some embodiments, the policy recommendation module 630 may consider one or more properties of a backup source or backup target. For example, the policy recommendation module 630 may consider the size of the backup source and the capacity of a backup target.

The policy recommendation module 630 may also consider historical information associated with the backup policy. For example, the policy configuration module 630 may consider the scheduled start time of a backup job, the actual start time of a backup job, the period of time usually required to complete the backup, and information about whether previous attempts to back up the backup source were successful.

The policy recommendation module 630 may also automatically consider hypothetical adjustments to a backup policy to determine a schedule of backup jobs that is free of conflicting backup jobs. In some embodiments, the policy recommendation module 630 may attempt to optimize the backup policy by eliminating or minimizing conflicts. In other embodiments, the policy recommendation module 630 may attempt to reduce conflicts below a particular threshold.

The policy recommendation module 630 may consider whether creating, removing, or adjusting one or more backup target pools would achieve a preferable backup policy. In other embodiments, the policy recommendation module 630 may consider whether provisioning one or more additional backup targets would be desirable to relieve an over-utilized system. Similarly, the policy recommendation module 630 may consider whether remove one or more existing backup targets would be desirable to improve efficiency in an underutilized system.

Furthermore, the policy recommendation module 630 may analyze a backup policy prospectively. For example, when a new backup source is added to the system configuration information, there may be no historical backup information associated with it. The policy recommendation module 630 may automatically analyze hypothetical changes to the backup configuration information or the system configuration information. The policy recommendation module 630 may also analyze probabilities that a particular backup job is likely to complete successfully and within the allotted time. For example, the policy recommendation module 630 may allot more time for a backup job in which the backup source's size tends to grow quickly, or when the backup source is on a network with highly variable bandwidth.

In some embodiments, the policy recommendation module 630 may make adjustments to the system configuration information or the policy configuration information automatically. In other embodiments, the policy recommendation module 630 may provide one or more policy recommendations to a user, such as a backup administrator, to approve or reject the policy recommendation. In other embodiments, the backup administrator may be able to adjust a policy recommendation prior to approving it.

In some embodiments, the policy recommendation module 630 may use the policy visualization module 640 to generate a graphical user interface for viewing or manipulating a policy recommendation. In the context of backup policies, the policy visualization module 640 may show one or more timelines that reflect when backup jobs are scheduled for particular backup targets or backup target pools. The policy visualization module 640 may show graphical representations of backup sources indicating the time at which a backup job is scheduled for combinations of backup sources and backup targets. The representations of the backup sources and backup targets may indicate properties of the backup sources and backup targets. For example, the size of a backup source or the capacity of a backup target may be indicated. In some embodiments, colors or other graphical representations may be used to show periods of time when backup targets are idle or in-use, or when two or backup jobs conflict with each other. Other graphical effects, such as three-dimensional or transparency graphical effects, may be used to enhance the aesthetic or functional effectiveness of the visualized policy. For example, if a system configuration or recommended system configuration includes a backup target pool, the policy visualization module 640 may represent the individual backup targets within the backup target pool using depth perspective techniques.

The policy visualization module 640 may provide a user, such as a backup administrator, with a graphical representation of a policy recommendation from the policy recommendation module 630. In some embodiments, the user may make adjustments to the policy recommendation, and the policy visualization module 640 may update the graphical representation of the policy recommendation to reflect the adjustments made by the user. In other embodiments, the user may make adjustments to the policy representation by manipulating graphical user interface elements within the visualized policy. For example, the policy visualization module 640 may enable a backup administrator to drag a backup job to an earlier or later time along a timeline to change the time at which the backup job is scheduled to begin, or the drag a backup job from one timeline to another to change from backup target to another. The policy visualization module 640 may communicate the user's adjustments to the policy recommendation module 630 to analyze the impact of the user's adjustments. The policy recommendation module 630 may communicate the analysis of the impact to the policy visualization module 640 so it may graphically depict whether the user's adjustment is recommended based on the policy analysis.

The policy visualization module 640 may receive an indication from a user that indicates that the user would like to accept or reject the visualized policy. The policy visualization module 640 may communicate the user's indication to the policy recommendation module 630 for further processing.

Figure 7:
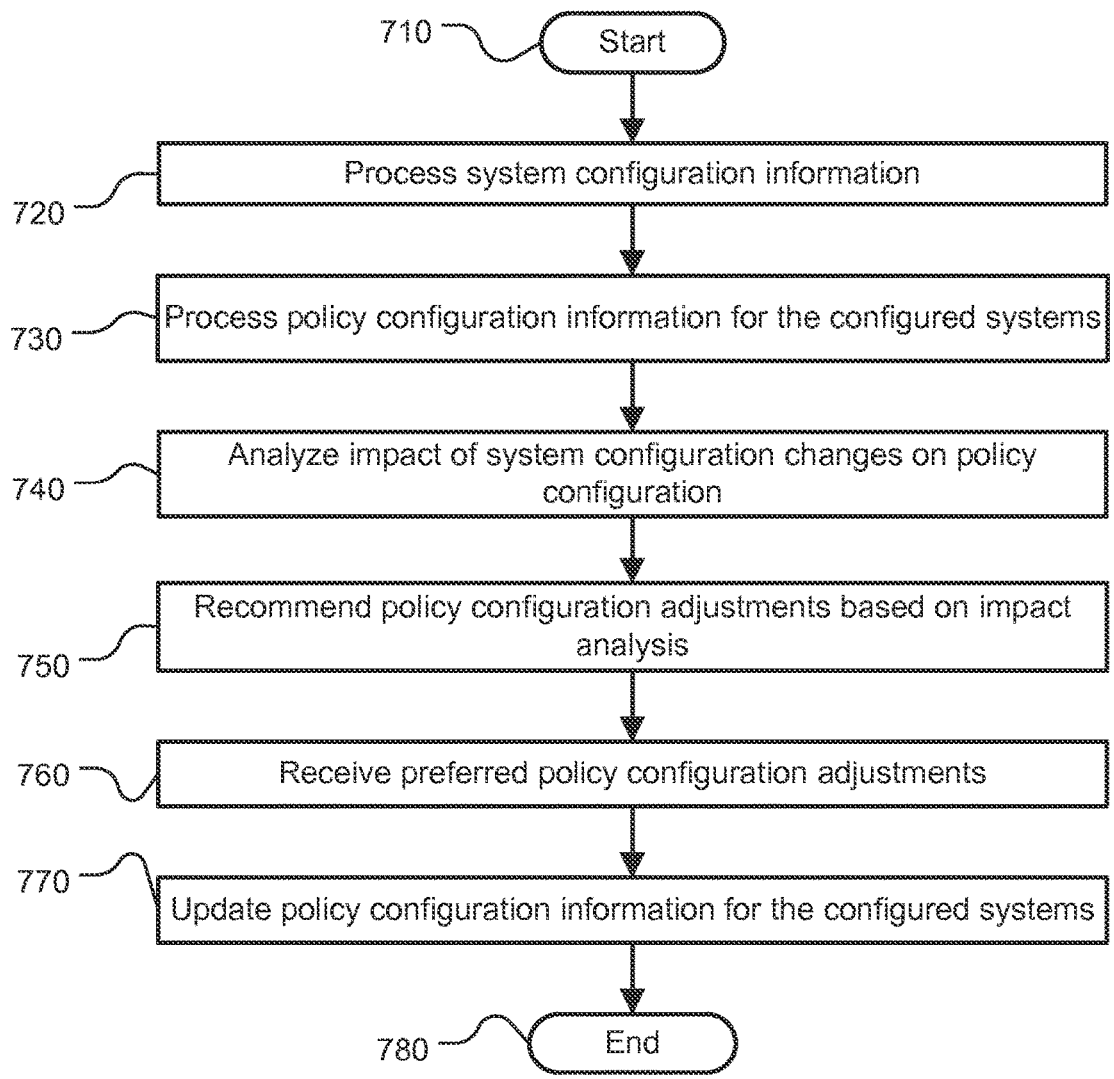
FIG. 7 depicts a method for policy analysis in accordance with an embodiment of the present disclosure.

Referring to FIG. 7, there is depicted a method 700 for policy analysis in accordance with an embodiment of the present disclosure. At block 710, the method 700 may begin.

At block 720, system configuration information may be processed. In the context of backup system configuration information, the backup system may include one or more backup sources and one or more backup targets.

At block 730, policy configuration information for the configured systems may be processed. In the context of backup policy configuration information, the backup policy may contain one or more backup jobs for the components in the configured system.

At block 740, in some embodiments, the impact of system configuration change on policy configuration may be analyzed. For example, in the context of a backup system, changes may include properties such as the size of a backup source or the addition or removal of an additional backup source or backup target.

At block 750, policy configuration adjustments may be recommended. In some embodiments, the policy configuration adjustments may be based on changes to the system configuration analyzed at block 740.

At block 760, preferred policy configuration adjustments may be received. In some embodiments, a user may indicate approval of the policy configuration adjustments recommended at block 750. In other embodiments, a user may indicate different adjustments to the policy configuration based on the policy configuration recommended at block 760. In some embodiments, a user may indicate approval or different adjustments to the system configuration based on the policy configuration recommended at block 760. For example, in the context of a backup policy, a backup administrator may adjust the system configuration by adding a new backup target.

At block 770, policy configuration information for the configured systems may be updated based on the preferred policy configuration adjustments received at block 760. In some embodiments, system configuration information for the configured systems may be updated based on the preferred system configuration adjustments received at block 760.

At any point in the method 700, the method 700 may be repeated or terminated early as needed (not shown). For example, a user may reject changing the policy configuration information before it is updated at block 770, or preferred policy configuration adjustments may be received from a user at block 760 that may be reanalyzed at block 740.

At block 780, the method 700 may end.

At this point it should be noted that policy analysis in accordance with the present disclosure as described above may involve the processing of input data and the generation of output data to some extent. This input data processing and output data generation may be implemented in hardware or software. For example, specific electronic components may be employed in a policy analysis module or similar or related circuitry for implementing the functions associated with policy analysis in accordance with the present disclosure as described above. Alternatively, one or more processors operating in accordance with instructions may implement the functions associated with policy analysis in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for automated policy analysis to prevent data loss or degradation of system performance from conflicting backups, comprising:

processing system configuration information for a backup system comprising at least one backup source and a plurality of backup targets;

processing policy configuration information for the backup system and generating a backup policy for scheduling each backup job with a backup time window for each backup back up job;

generating a recommendation including hypothetical adjustments to the backup policy to determine a schedule of backup jobs that is free of conflicting backup jobs by 1) creating, removing, or adjusting backup sources of the backup system to prevent backup conflicts and 2) adjusting the backup policy for scheduling of each backup job and associated backup targets and backup sources to prevent backup conflicts;

generating a graphical user interface having an interactive visualization to display the recommendation, wherein the graphical user interface includes at least a timeline reflecting job scheduling information for the plurality of backup targets;

receiving a user input via the graphical user interface to make an adjustment to the recommendation to form an adjusted recommendation;

updating the policy configuration information for the system based on user input to the graphical user interface of an adjustment by the user to the recommendation and communicating the impact to the graphical user interface to depict to the user whether the adjusted recommendation is recommended; and receiving a user input, via the graphical user interface, to approve the policy configuration of the recommendation or the adjusted recommendation, as the backup system configuration.

2. The method of claim 1, wherein the hypothetical adjustments include identifying at least one change to at least one backup window to compensate for time periods when the backup system is underutilized or overutilized.

3. The method of claim 1, wherein the hypothetical adjustments include analyzing probabilities that individual backup jobs are likely to complete successfully and within an allotted time.

4. A system for automated policy analysis comprising:
one or more processors communicatively coupled to a network; wherein the one or more processors are configured to:
process system configuration information for a backup system comprising at least one backup source and a plurality of backup targets;
process policy configuration information for the backup system;
analyze at least one policy configuration change to the policy configuration information by considering a predicted data growth rate of the at least one backup source and a determination of an average size of multiple portions of data that has changed on the at least one backup source, wherein the at least one policy configuration change resolves at least one backup job conflict with a first backup job by rescheduling the first backup job from a first backup target of the plurality of backup targets to a second backup target of the plurality of backup targets;
generate a recommendation including hypothetical adjustments to the backup policy to determine a schedule of backup jobs that is free of conflicting backup jobs by creating, removing, or adjusting backup sources of the backup system to prevent backup conflicts and adjusting the backup policy based on the analysis of the at least one policy configuration change for scheduling of each backup job and associated backup targets and backup sources to prevent backup conflicts;
generate a graphical user interface to display the recommendation, wherein the graphical user interface has an interactive visualization that includes at least a timeline reflecting job scheduling information for the plurality of backup targets; and receive a user input via the graphical user interface to make an adjustment to the recommendation to generate an adjusted recommendation;

update the policy configuration information for the system based on user input to the graphical user interface of an adjustment by the user to the recommendation and communicating the impact to the graphical user interface to depict to the user whether the adjusted recommendation is recommended; and receive a user input, via the graphical user interface, to approve the policy configuration of the recommendation or the adjusted recommendation, as the backup system configuration;

wherein the second backup target of the plurality of backup targets is selected at least based on a reliability of a connection between the second backup target and a network.

5. The system of claim 4, wherein the hypothetical adjustments comprise identifying at least one change to at least one backup window to compensate for time periods when the backup system is underutilized or overutilized.

6. The system of claim 4, wherein the hypothetical adjustments comprise analyzing probabilities that individual backup jobs are likely to complete successfully and within an allotted time.

7. The system of claim 4, wherein the one or more processors are further configured to:
analyze at least one system configuration change to the system configuration information; recommend the at least one system configuration change based on the analysis of the at least one system configuration change; and
update the policy configuration information for the system based on the recommendation of the at least one system configuration change.

8. The system of claim 4, wherein the at least one system configuration change includes adding a new backup target to the backup system.

9. The system of claim 4, wherein the at least one backup job conflict comprises a first end time of the first backup job that is later than a second end time of a backup window of the policy configuration information.

10. An article of manufacture for automated policy analysis, the article of manufacture comprising:
at least one non-transitory processor readable storage medium; and instructions stored on the at least one medium;
wherein the instructions are configured to be readable from the at least one medium by at least one processor and thereby cause the at least one processor to operate so as to:
process system configuration information for a backup system comprising at least one backup source and a plurality of backup targets;
process policy configuration information for the backup system;
analyze at least one policy configuration change to the policy configuration information by considering a predicted data growth rate of the at least one backup source and a determination of an average size of multiple portions of data that has changed on the at least one backup source, wherein the at least one policy configuration change resolves at least one backup job conflict with a first backup job by rescheduling the first backup job from a first backup target of the plurality of backup targets to a second backup target of the plurality of backup targets;

generate a recommendation including hypothetical adjustments to the backup policy, analyzing probabilities that individual backup jobs are likely to complete successfully and within an allotted time, and determine a schedule of time windows of backup jobs that is free of conflicting backup jobs by creating, removing, or adjusting backup sources of the backup system to prevent backup conflicts and adjusting the backup policy based on the analysis of the at least one policy configuration change for scheduling each backup job and associated backup targets and backup sources to prevent backup conflicts;

generate a graphical user interface to display the recommendation wherein the graphical user interface includes an interactive visualization having at least a timeline reflecting job scheduling information for the plurality of backup targets; and update the policy configuration information for the system based on user input to the graphical user interface of an adjustment by the user to the recommendation to form an adjusted recommendation and communicating the impact to the graphical user interface to depict to the user whether the adjusted recommendation is recommended;

receive a user input via the graphical user interface to make an adjustment of the recommendation; and receive a user input, via the graphical user interface, to approve the policy configuration of the recommendation or the adjusted recommendation, as the backup system configuration;

wherein the second backup target of the plurality of backup targets is selected at least based on a reliability of a connection between the second backup target and a network.

11. The article of manufacture of claim 10, wherein the backup system further comprises at least one backup target pool comprising multiple backup targets of the plurality of backup targets.

12. The article of manufacture of claim 10, wherein the at least one backup job conflict comprises a first backup time period of the first backup job overlapping a second backup time period of a second backup job.

13. The article of manufacture of claim 10, wherein the instructions cause the at least one processor to operate further so as to:

analyze at least one system configuration change to the system configuration information;

recommend the at least one system configuration change based on the analysis of the at least one system configuration change; and update the policy configuration information for the system based on the recommendation of at least one system configuration change.

14. The article of manufacture of claim 10, wherein the at least one system configuration change includes adding a new backup target to the backup system.

15. The article of manufacture of claim 10, wherein the at least one backup job conflict comprises a first end time of the first backup job that is later than a second end time of a backup window of the policy configuration information.

* * * * *